(12) United States Patent
Fariello

(10) Patent No.: US 9,861,228 B1
(45) Date of Patent: Jan. 9, 2018

(54) STRUCTURALLY EFFICIENT, REDUCED MATERIAL FOLDING STAND FOR A CHAFING DISH

(71) Applicant: Michael Fariello, Bohemia, NY (US)

(72) Inventor: Michael Fariello, Bohemia, NY (US)

(*) Notice: Subject to any disclaimer, the term of this patent is extended or adjusted under 35 U.S.C. 154(b) by 0 days.

(21) Appl. No.: 15/413,606

(22) Filed: Jan. 24, 2017

(51) Int. Cl.
*A47J 36/24* (2006.01)
*F16M 11/38* (2006.01)

(52) U.S. Cl.
CPC ............. *A47J 36/24* (2013.01); *F16M 11/38* (2013.01)

(58) Field of Classification Search
CPC ........ F16M 11/38; B65D 21/046; B65D 7/20; A47J 36/24; A47J 36/2405; A47J 36/0694; A47J 36/0763; A47J 36/26; A47J 36/34
USPC .......................................... 248/150, 151, 153
See application file for complete search history.

(56) References Cited

U.S. PATENT DOCUMENTS

| | | | |
|---|---|---|---|
| 1,612,937 A * | 1/1927 | Mitchell | A47F 5/13 108/59 |
| 1,701,989 A | 2/1929 | Turner | |
| 1,947,932 A | 2/1934 | Fant | |
| 1,987,378 A | 1/1935 | Tansley | |
| 2,274,772 A | 3/1942 | Bitney | |
| 2,376,640 A * | 5/1945 | Wall | A47J 37/0694 126/337 R |
| D146,832 S | 5/1947 | O'Connell | |
| 2,503,795 A | 4/1950 | Brown | |
| 2,625,148 A | 1/1953 | Snyder | |
| 2,804,068 A * | 8/1957 | Miller | F24C 15/16 126/337 R |
| D189,469 S | 12/1960 | Fischer | |
| 3,361,126 A | 1/1968 | Bloomfield | |
| 3,364,844 A | 1/1968 | Felske | |
| D213,899 S | 4/1969 | Rickmeier | |
| 4,191,160 A * | 3/1980 | Elliott | A47J 37/0763 126/25 R |
| 4,433,671 A | 2/1984 | DeAmicis | |
| 4,718,402 A | 1/1988 | Fordyce | |
| 4,920,873 A | 5/1990 | Stevens | |
| 5,045,672 A | 9/1991 | Scott | |
| 5,092,311 A | 3/1992 | Ririe | |
| 5,287,800 A | 2/1994 | Orednick | |
| 5,301,909 A | 4/1994 | Chang | |
| 5,347,979 A | 9/1994 | Haber | |
| 5,467,697 A | 11/1995 | Hunziker | |

(Continued)

*Primary Examiner* — Patrick Hawn
(74) *Attorney, Agent, or Firm* — Thomas A. O'Rourke; Bodner & O'Rourke, LLP

(57) ABSTRACT

A collapsible chafing dish stand includes a rim that holds the chafing dish pan; a first leg formed into a first geometric shape having two ends each pivotally coupled to the rim; a second leg similarly formed with two ends each pivotally coupled to the rim; a first cross bar and a second cross bar each formed into a select geometric shape, and pivotally coupled to the first leg and the second leg, respectively; and a hook to releasably couple the first cross bar to the second cross bar to secure the first and second legs in a support position. The improved configuration permits manufacture of a stand with fewer wire bends, simplified hinges and hook, simplified coupling of cross bars, and simplified geometric shapes, all of which combine to minimize material usage, and be more economically producible in a highly competitive marketplace, while retaining structural integrity.

10 Claims, 10 Drawing Sheets

(56) References Cited

U.S. PATENT DOCUMENTS

| | | | |
|---|---|---|---|
| 5,517,903 A | 5/1996 | Kaulman | |
| 5,819,640 A | 10/1998 | Cuomo | |
| D406,984 S | 3/1999 | Skvorecz | |
| 5,921,513 A | 7/1999 | Skvorecz | |
| 6,047,932 A | 4/2000 | Skvorecz | |
| 6,234,068 B1 | 5/2001 | Sherman | |
| D667,257 S | 9/2001 | Saboe | |
| 6,520,354 B1 | 2/2003 | Skvorecz | |
| 6,595,120 B1 * | 7/2003 | Tiemann | A47J 37/0694 211/181.1 |
| D485,706 S | 1/2004 | Cooper | |
| 6,955,327 B1 * | 10/2005 | Skvorecz | A47J 36/34 126/40 |
| D626,377 S * | 11/2010 | Contreras | D7/355 |
| 7,828,160 B2 * | 11/2010 | Lin | A47B 47/021 211/181.1 |
| 9,414,712 B2 | 8/2016 | Skvorecz | |
| 9,517,858 B2 | 12/2016 | Skvorecz | |
| 9,539,677 B2 * | 1/2017 | Skvorecz | B65D 7/20 |
| 2005/0167381 A1 | 8/2005 | Fariello | |

* cited by examiner

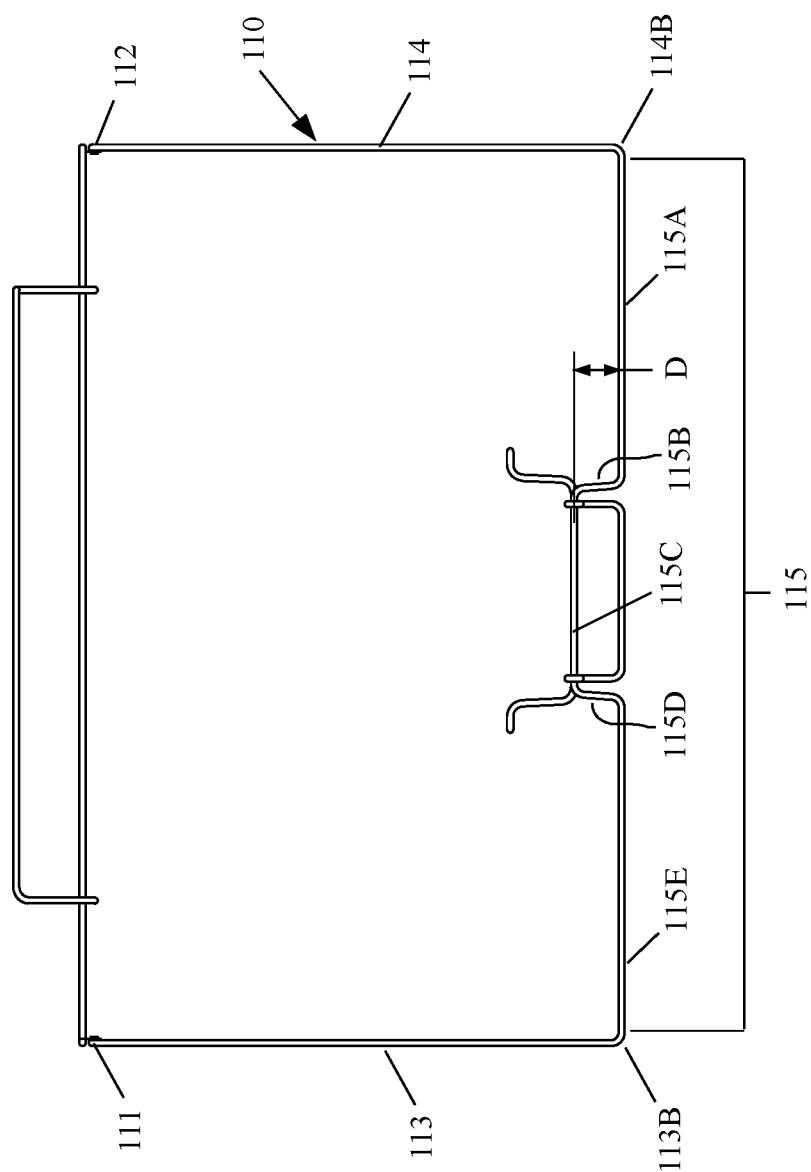

STRUCTURALLY EFFICIENT, REDUCED MATERIAL FOLDING STAND FOR A CHAFING DISH

FIELD OF THE INVENTION

The present invention relates to stands for a chafing dish, and more particularly to a folding stand having a locking feature between the legs which prevents the inadvertent collapse of the stand when in use, which stand is structurally efficient such that it minimizes material utilized with a simplified construction to be more cost effective in a competitive marketplace.

BACKGROUND OF THE INVENTION

Traditional chafing dishes are typically comprised of a stand, a water pan, a dish, and heat source. The stand holds the water pan over the heat source which heats the water. A dish or dishes containing food are then suspended in the water pan to keep the food warm.

Chafing dishes are commonly used by caterers, who transport the equipment to different locations, assembling the chafing dishes for use, and then, dismantling and storing the equipment for later use. Although a chafing dish is not considered standard household kitchen equipment, chafing dishes are often uses in private homes for an occasional large party. Therefore, it is desirable to have a chafer stand that is easy to transform between its stowed compact configuration, and its extended support position As the marketplace is increasingly competitive, it is just as necessary that the stand or rack be constructed to be as structurally efficient as possible, to minimize the use of raw materials (e.g., a reduced weight rack), without simply reducing a gauge of any wire materials that may be utilized. Structural efficiency herein may also be obtained by minimizing the number of bends or connections of the structural members, and by simplifying the hinging and pivotal couplings as much as possible, and reducing the amount of material that is used overall.

There are a number of chafing dish stands found in the prior art, each of which fails to address those issues relating to its structural efficiency, as disclosed within this specification.

U.S. Pat. No. 5,517,903 to Kaufman is for a portable chafing dish rack having a collapsible stand formed of four rigid plates. The plate are rotatably coupled together by piano hinges. Upon removal of one hinge pin, the plates of the stand will collapse into a compact and substantially flat configuration for storage of the device. But the pin is a separate part from the stand itself, and is subject to being misplaced or permanently lost. Also, the four-sided stand requires use of a rigid rectangular tray. The numerous separate components of this stand are very inefficient with respect to minimizing material and reducing costs.

U.S. Patent Application Pub. No. 2005/0167381 is for a Folding Rack for a Chafing Dish, and its configuration is also inefficient with respect to minimizing material utilized and reducing the per-unit cost of production.

U.S. Pat. No. 5,467,697 to Hunziker discloses a foldable chafer stand that includes a top frame having a substantial width, that is supported by legs. The legs can pivot from an extended position into proximity with the top frame. Cantilevered rings extend from the frame to hold the heat sources, and may be swung to a desired position beneath the pan supported by the frame. This chafer stand, however, has no stabilizing member to restrain the legs. Therefore, if one leg were to be pushed, it could collapse and permit the pan to topple over, causing steaming water or hot food to spill out. and possibly causing burning fuel to spill onto a surface that may be flammable. The Hunziker chafer stand is also very inefficient with respect to minimizing material and reducing the per-unit cost of production.

U.S. Pat. No. 5,287,800 to Orednick discloses a caterer's food display system that includes a plurality of bent wires and separate plastic legs that can be attached to the wire supports. This device suffers from some of the same disadvantages as the prior addressed above, requiring attention to the multiplicity of pieces, and its construction is not very efficient.

U.S. Pat. No. 6,234,068 to Sherman discloses a collapsible food service tray. However, the disclosed legs are unsecured, which is similarly susceptible to the same danger associated with an unintentional collapse of one or both of its legs, and its construction is also not very efficient.

The chafer stand of the present invention provides a significant improvement over each of those invention, and other prior art inventions.

OBJECTS OF THE INVENTION

It is an object of the invention to provide a stand for a chafing dish that is collapsible.

It is another object of the invention to provide a collapsible stand for a chafing dish having legs that are easily moved between a stowed position and a support position.

It is a further object of the invention to provide a collapsible stand for a chafing dish that includes simplified geometric shapes with fewer bends, and which are cheaper to manufacture.

It is another object of the invention to provide a collapsible stand for a chafing dish that minimizes material usage.

It is also an object of the invention to provide a collapsible stand for a chafing dish that is more economically producible in a highly competitive marketplace, while retaining structural integrity.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A stand for a chafing dish disclosed herein may require no assembly, and the moveable components of the one-piece stand may permit it to occupy a stowed, stackable position, and also an extended, support position. The stand is very stable in the extended support position due to a locking feature of its construction, which prevents the movement of the legs that could otherwise permit collapse of the device when in use.

In accordance with at least one embodiment of the present invention, the collapsible stand may include a rim configured to hold at least one chafing dish pan; first and second legs; first and second cross bars; and a latch.

The first leg may be formed into a first geometric shape, and may be configured for a first end to be in proximity to a first, portion of a first side of the rim, and for a second end to be in proximity to, a second portion of the rim at a second side thereof. The second leg may be formed into a second geometric shape configured for a first end of the second leg to be in proximity to a third portion of the rim being on the first side of the rim, and for a second end of the second leg to be in proximity to a fourth portion of the rim, being on the second side of the rim. The first and second geometric shapes may be the same. or may be slightly different.

The first and second ends of the first leg and the first and second ends of the second leg may each be pivotally coupled to the rim using a simple hinge arrangement, for each the leg to be able to pivot between a collapsed, storable position, and an extended support position.

The first cross bar may be pivotally coupled to the first leg; and the second cross bar may be pivotally coupled to the second leg.

The latch may be in the form of a hook member. The hook member may have a first portion secured to the first cross bar, and may have a second portion configured to be releasably coupled to a portion of the second cross bar, when the first and second legs are in the extended support position.

In one embodiment, the first leg may be formed of a first wire member bent into the first geometric shape, and the second leg may be formed of a second wire member bent into the second geometric shape. The first cross bar may be formed of a third wire member that may be bent into a third geometric shape, and the second cross bar may be formed of a fourth wire member that may be bent into a fourth geometric shape.

In one embodiment, the pivotal coupling of the first cross bar to the first leg may be with at least one end of the third wire member being bent about a portion of the first wire member forming the first leg. Similarly, the pivotal coupling of the second cross bar to the second leg may be with at least one end of the fourth wire member being bent about a portion of the second wire member forming the second leg.

The improved configuration disclosed herein permits manufacture of a stand with fewer wire bends, simplified hinges and a simplified latch arrangement, simplified coupling of the cross bars to the legs, and simplified geometric shapes, all of which combine to minimize material usage, and be more economically producible in a highly competitive marketplace, while retaining structural integrity.

The collapsible stand may also include a fifth wire member selectively shaped and bent to support a fuel canister holder, where the shaped and bent fifth wire member may be secured to the first cross bar. A sixth wire member may be selectively shaped and bent to support another fuel canister holder, where the shaped and bent sixth wire member may be secured to the second cross bar.

In addition, the collapsible stand may also include a seventh wire member shaped and bent to form a first handle member, where the first handle member may be secured to a portion of the rim, which may be at one end. Also, an eighth wire member may be similarly shaped and bent to form second handle member, which may be secured to another portion of the rim, which may be at an opposite end of the rim.

BRIEF DESCRIPTION OF THE DRAWINGS

The description of the various example embodiments is explained in conjunction with appended drawings, in which:

FIG. 4 illustrates an end view of a collapsible stand for a chafing dish pan, in accordance with the embodiment of FIG. 1;

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or", are open-ended expressions that are both conjunctive and disjunctive in operation. For example, each of the expressions "at least one of A, B and C", "one or more of A, B, and C", and "A, B and/or C" mean all of the following possible combinations: A alone; or B alone; C alone; or A and B together; or A and C together; or B and C together; or A, B and C together.

Also, all references (e.g., patents, published patent applications, and non-patent literature) that are cited within this document are incorporated herein in their entirety reference.

Furthermore, the described features, advantages, and characteristics of any particular embodiment disclosed herein, may be combined in any suitable manner with any of the other embodiments disclosed herein.

It is further noted that any use herein of relative terms such as "top," "bottom," "upper," "lower," "vertical," and "horizontal" are merely intended to be descriptive for the reader, based on the depiction of those features within the figures for one particular position of the device, and such terms are not intended to limit the orientation with which the device of the present invention may be utilized.

Figure 10:
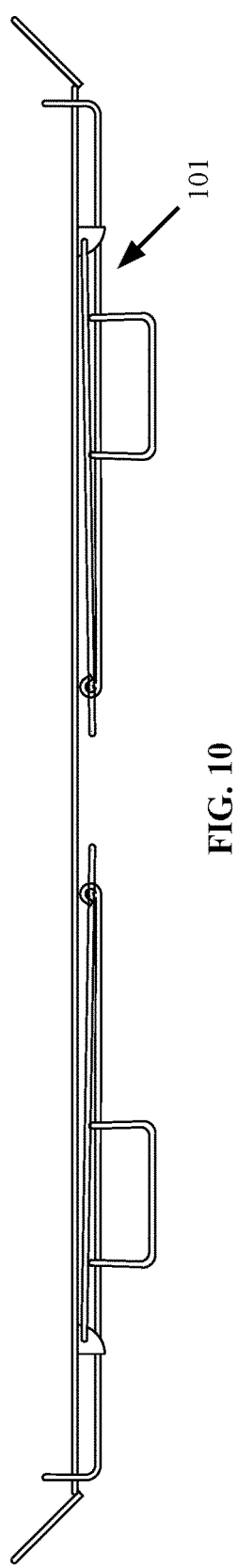
FIG. 10 illustrates the side view of the collapsible stand for a chafing dish pan, in accordance with the embodiment of FIG. 1. but is shown with both of the cross bars and both of the les have been pivoted into the retracted position.

The chafer stand disclosed herein may be made of a plurality of component parts that form a one-piece chafing dish support stand, which may easily be manipulated between its collapsed position that permits storing and even stacking of multiple such stands (see e.g., FIG. 10), and an extended support position that may be used to support one or more chafing dish pans. The chafer stand is also particularly stabile because of a locking feature that prevents the movement of the legs which can cause a collapse of the device when in use.

Figure 1:
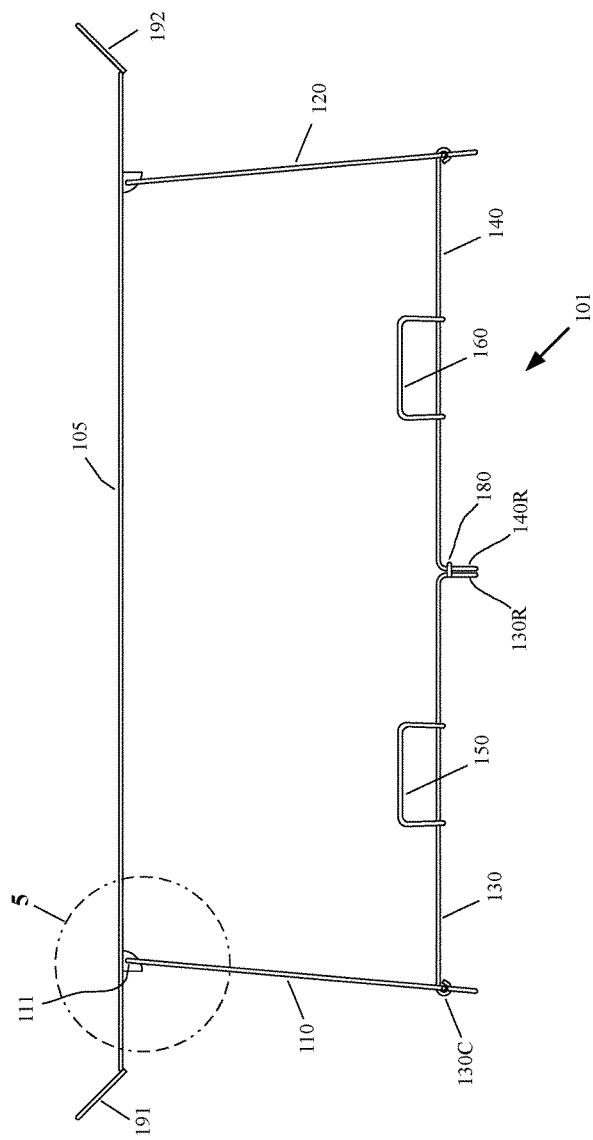
FIG. 1 illustrates a side view of a collapsible stand for a chafing dish pan, in accordance with one embodiment the present invention.
Figure 2:
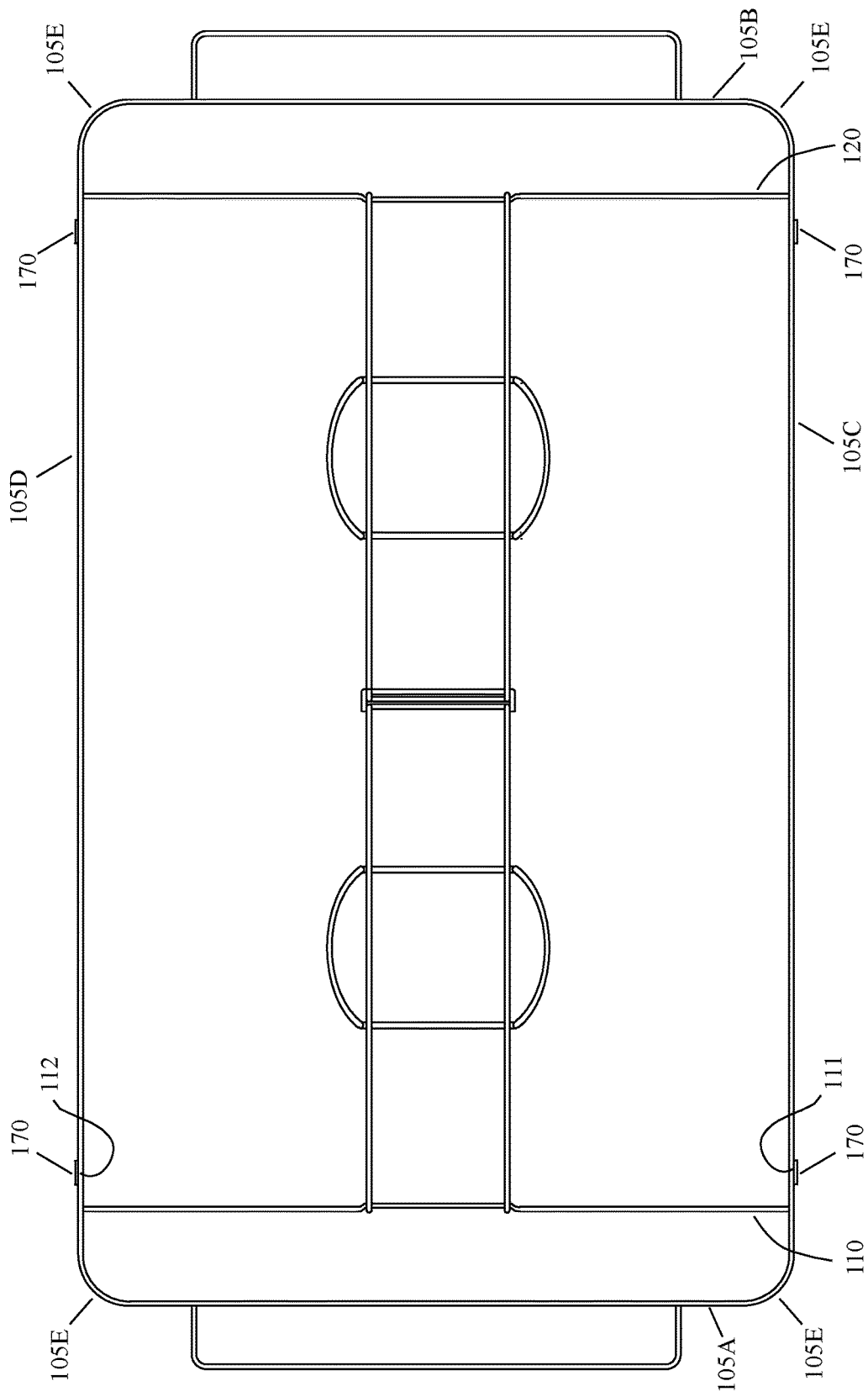
FIG. 2 illustrates a top view of a collapsible stand for a chafing dish pan, in accordance with the embodiment of FIG. 1.

FIG. 1 illustrates a first embodiment of a chafer stand formed in accordance with the present invention. As seen in FIG. 1 and FIG. 2, chafer stand 191 may include a rim 105. The rim 105, as well as other component parts of chafer stand 101 described hereinafter, may each be formed of an elongated member which inlay have a uniform cross-sectional shape. The cross-sectional shape utilized may be rectangular, or circular, or any other shape. To create a member with a cross-section that is efficient with respect to maximizing its moment of inertia and minimizing the amount of material utilized for the stand, the cross-sectional shape used may be square or circular. Use of wire produced from a circular cross-sectional shape may be optimal for making the stand disclosed herein, due to its ease of forming desired geometric shapes/bends and due to other manufacturing consideration.

The rim 105 is configured to circumscribe an open area that may be sized and shaped to receive a portion of the chafing dish pan through the open area thereby formed, in one embodiment, the rim 105 may have two short straight sides 110A and 110B, and two long straight sides 110C and 110D, which may be connected by curved portions 110E. The shape of rim 105 being so formed may correspond to a typical elongated chafing dish pan, and may thus support at least a portion of an outer periphery of the chafing dish pan.

The chafer stand 101 may also have a first leg 110 and a second leg 120. The first leg 110 may be formed into a desired geometric shape that ultimately will contribute to minimizing the material used to make the stand, and reduce its per-unit cost, and which is further disclosed hereinafter. The first leg 110 may be formed of a wire member that may have a first end 111 and a second end 112. The wire may be bent into the desired geometric shape such that its first end 111 may be in proximity to a first portion of a first side (e.g., side 110A) of the rim 105, and the second end 112 may be in proximity to a second portion of the rim, with the second portion being on a second side of the rim (i.e., side 110B), for each end to be pivotally coupled to the rim 105. The first leg 110 may be formed to generally have three sides—side 113, side 114, and side 115, as shown in FIG. 4, with each side being formed so as to be substantially orthogonal to an adjacent side. The side 113 may transition into side 115 using a bend 113B, and side 114 may transition into side 115 using a bend 114B. Bends 114B and 115B may be formed with small radii (e.g., minimum bend radii for the material type), to maximize the extent of the contact provided with the surface upon which the chafer stand 101 rests, to improve stability. The transition may also be a welded joint that may eliminate the radius altogether.

Side 115 may be formed to be straight, and the pivotal coupling thereto of first and second cross beams 130/140 may be generally centered thereon, and which coupling may he inhibited from sliding laterally towards one side of the stand or the other, by using at least one stop (e.g., a small welded member) on the side 115.

Figure 11:
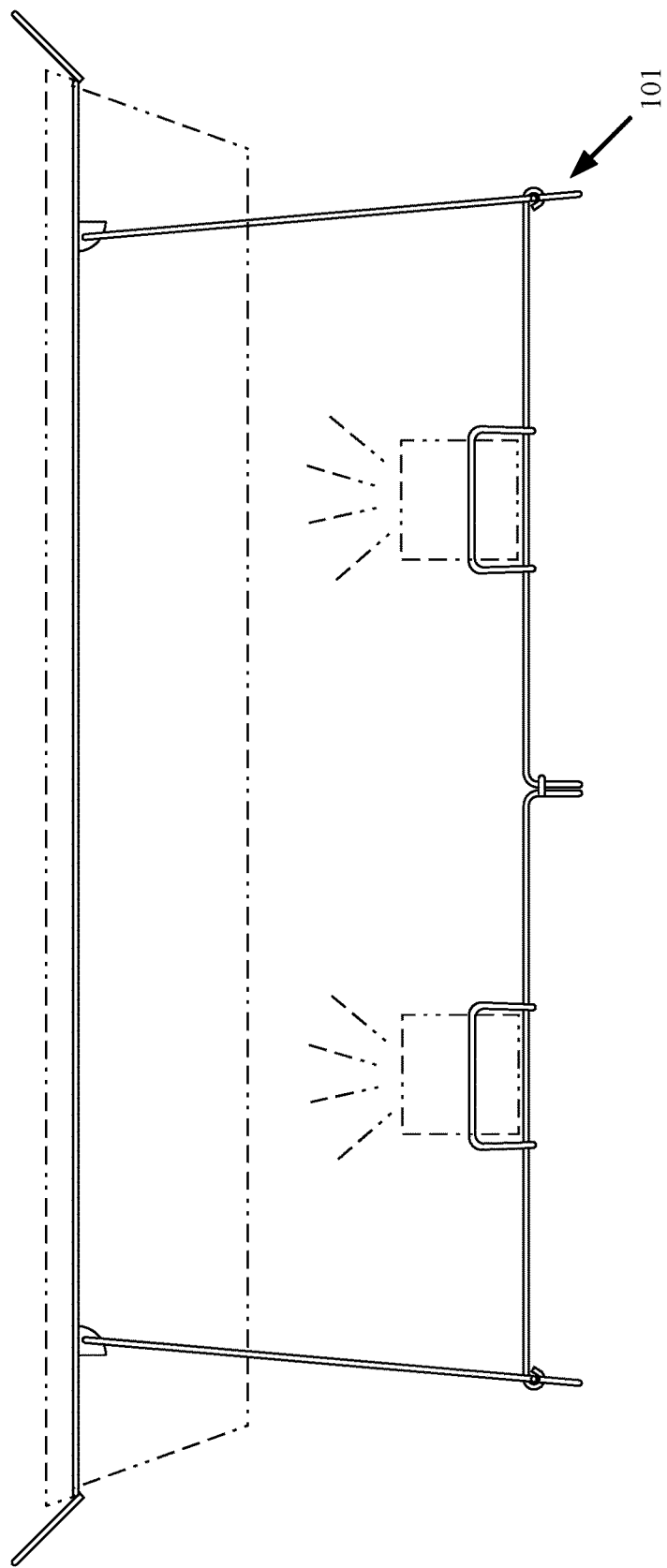
FIG. 11 illustrates the side view of the collapsible stand for a chafing dish pan, in accordance with the embodiment of FIG. 1, but is also shown with a chafing dish pan received and supported by the stand.

To improve the stability of the chafer stand 101, rather than using a straight side 115, a series of bends may be utilized to produce side portion 115A, side portion 115B, side portion 115C, side portion 115D, and side portion 115E. This may permit coupling of the first and second cross beams 130/140 to the side portion 115C such that the side portions 115A and 115E remain in contact with the table or other surface that the chafer stand is placed upon (i.e., the stand does not rock about that pivotal connection). The distance D that the side portion 115C may be offset from the side portion 115A may be selected to elevate the fuel canister holders 150/160 attached to the cross beams 130/140 into desired proximity to the bottom of the chafer tray when it is supported by the rim 105 (see FIG. 11). In another embodiment, the distance D may generally be minimized so as to be sufficient to permit free pivotal movement of the cross-beam attached thereto and also provide some additional clearance, but does not unnecessarily extend upward, which would entail additional material being utilized for the legs 110/120, and additional material also being utilized for the cross beams 130/140, adversely affecting the per-unit cost of the stand. For proper proximity of the fuel canisters, other adjustments may be made (e.g., reducing a height used for the legs which would also reduce material usage, and/or adjusting the fuel canister holder configuration, etc.).

The second leg 120 may be formed substantially the same as first leg 110, and may be formed into a geometric shape configured for the first end of the second leg to be in proximity to a third portion of the rim being on the first side of the rim (e.g., side 110A), and for the second end of the second leg to be in proximity to a fourth portion the rim on the second side (i.e., side 110B) of the rim 105.

Figure 6:
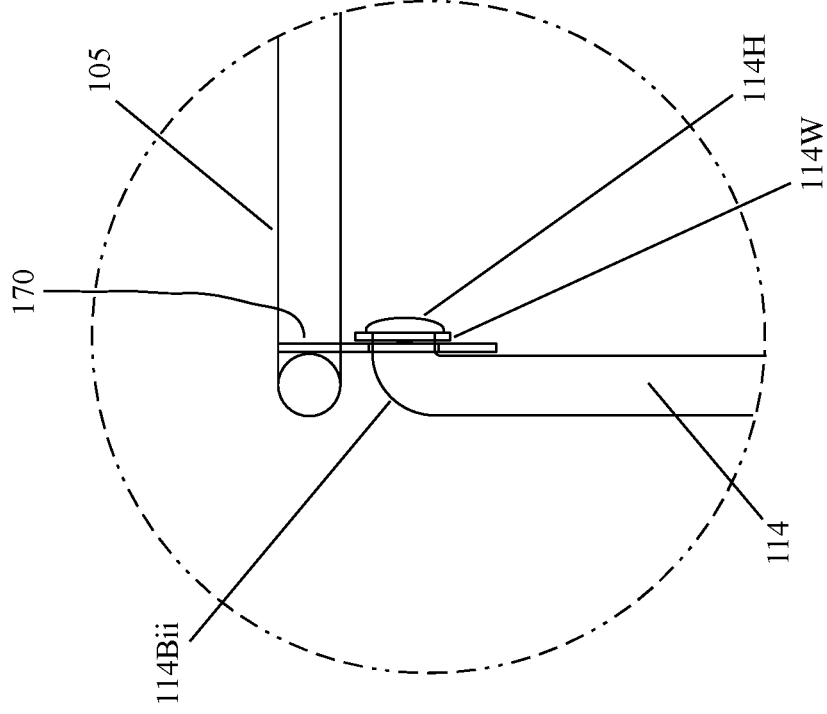
FIG. 6 illustrates a side view of the hinge arrangement of FIG. 5.
Figure 5:
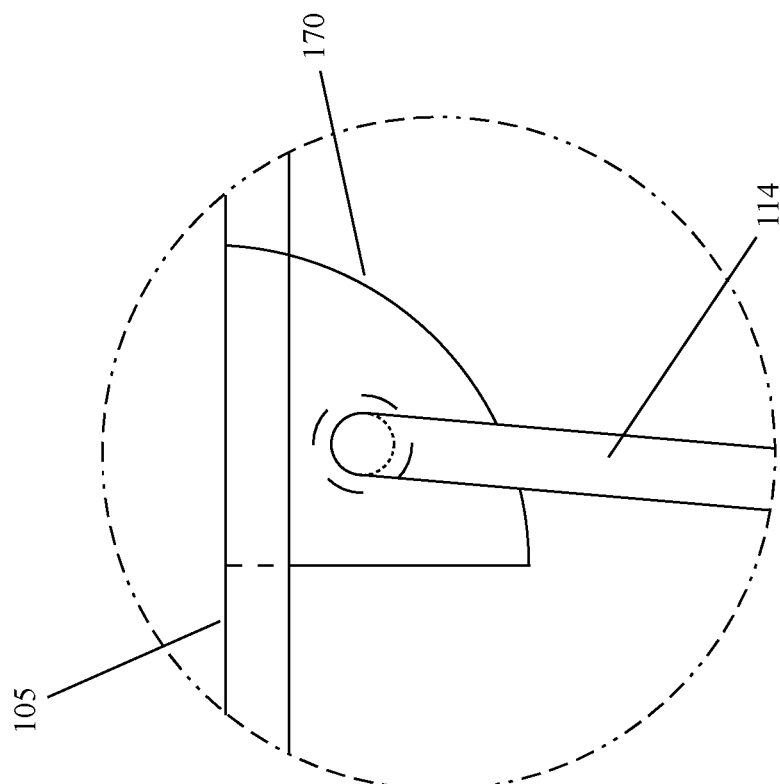
FIG. 5 illustrates an enlarged detail view of a hinge for pivotal coupling of the ends of the legs to the rim, for a collapsible stand for a chafing dish pan in accordance with the embodiment of FIG. 1.
Figure 8:
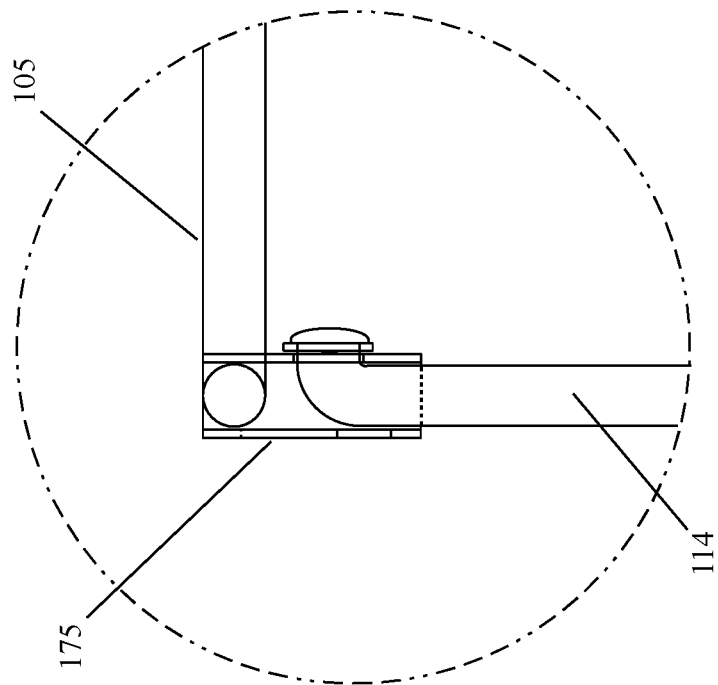
FIG. 8 illustrates a side view of the hinge arrangement of FIG. 7.
Figure 7:
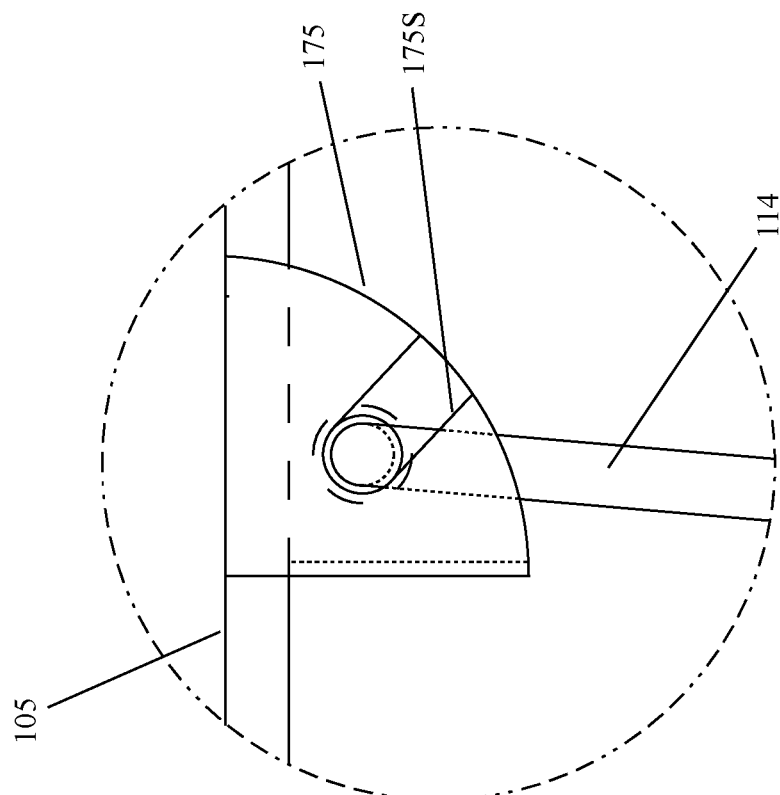
FIG. 7 illustrates an enlarged detail view of an alternate hinge arrangement for pivotal coupling of the legs to the rim of a collapsible stand for a chafing dish pan, in accordance with another embodiment.
Figure 9:
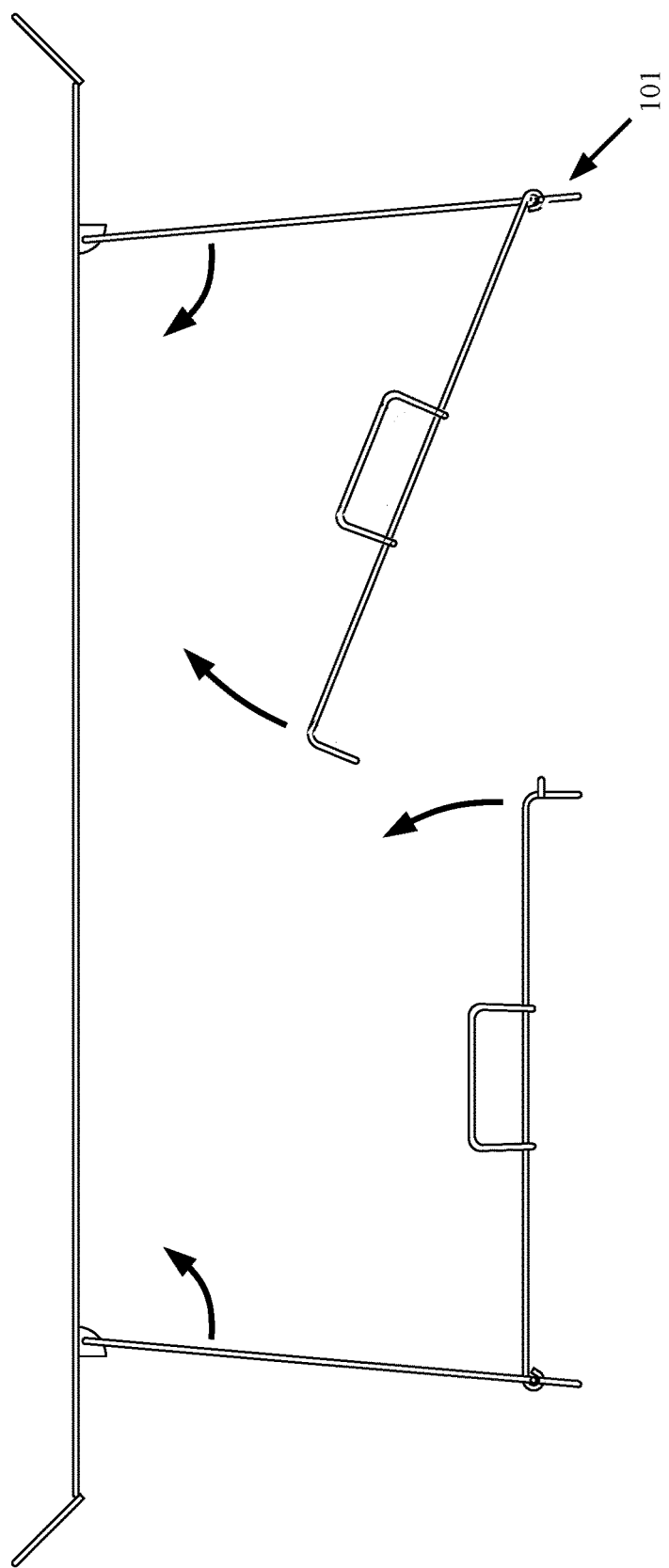
FIG. 9 illustrates the side view of the collapsible stand for a chafing dish pan, in accordance with the embodiment of FIG. 1, but is shown with the one of the cross bars have been unlatched and pivoted part-way between the extended support position and the retracted position.

Each of the ends of the first and second legs 110/120 may be pivotally coupled to the rim 105 using any suitable hinge configuration, of which there are numerous known in the art. To minimize material usage, the end of each leg 110/120 may be pivotally coupled to the appropriate point on the rim 105 using a pin with a head on each end. In another embodiment a plate 170 with a hole formed therein may be secured to the rim (e.g., by being welded thereto), for each of the first and second ends of the first and second legs, as shown in FIG. 5 and FIG. 6. Proximate to the end of each leg a bend may be formed (e.g., bend 114Bii), and the end of the leg may also be upset to form a head (e.g., head 114H), such that the plate is trapped between the bend and the head, with the leg being pivotally coupled thereto. One or more washers 114W may also be used to facilitate improved pivotal movement.

In another embodiment, rather than using flat plate 170, a plate 175 may be formed into a channel section, and each side of the pate may he secured (e.g., may be welded) to the rim 105. To facilitate easier introduction of the bent end of the leg into the hole, with nesting of the leg portion 114 between the sides of the plate 175, one side of the plate may have a slot 175S formed therein at a suitable orientation.

As seen in FIG. 1 the first crossbar 130 may be pivotally coupled to the first leg, by having its first end being bent into substantially a part-circular shape 130C when seen in that side view. Note that other shapes would also permit pivotal movement with respect to the wire forming that leg portion (e.g., a square shape), however, the circular shape may work best and provide for minimal material usage. In theory, that curved shape would be a portion of a torus. The second end of the first cross bar 130 may be bent to form a right-angle section 130R, which may have a length comparable to that of offset distance D, to permit the cross beam to be substantially parallel to the surface upon which the stand 101 will rest. The second cross bar 140 may be similarly formed, with a right-angle section 140R. The lengths of the cross beams 130/140 may be such that the right-angle section 130R and the right an section 140R may be in contact with each other with a modest friction fit therebetween, when the legs are in the support position, or they may merely be in close proximity to each other (e.g., separated by a distance of roughly 0.010-0.080 inches).

A latch may he used to releasably secure the right-angle section 130R to the right-angle section 140R. In one embodiment, the latch may be a hook member 180, where a first portion of the hook may be fixedly secured to the first cross bar, and a second portion may be configured to be releasably coupled to the second cross bar, when the first and second legs are in the support position. The hook may be sized and shaped to engage the second cross bar (e.g., the right-angle section 140R) with a slight friction fit therebetween.

Figure 3:
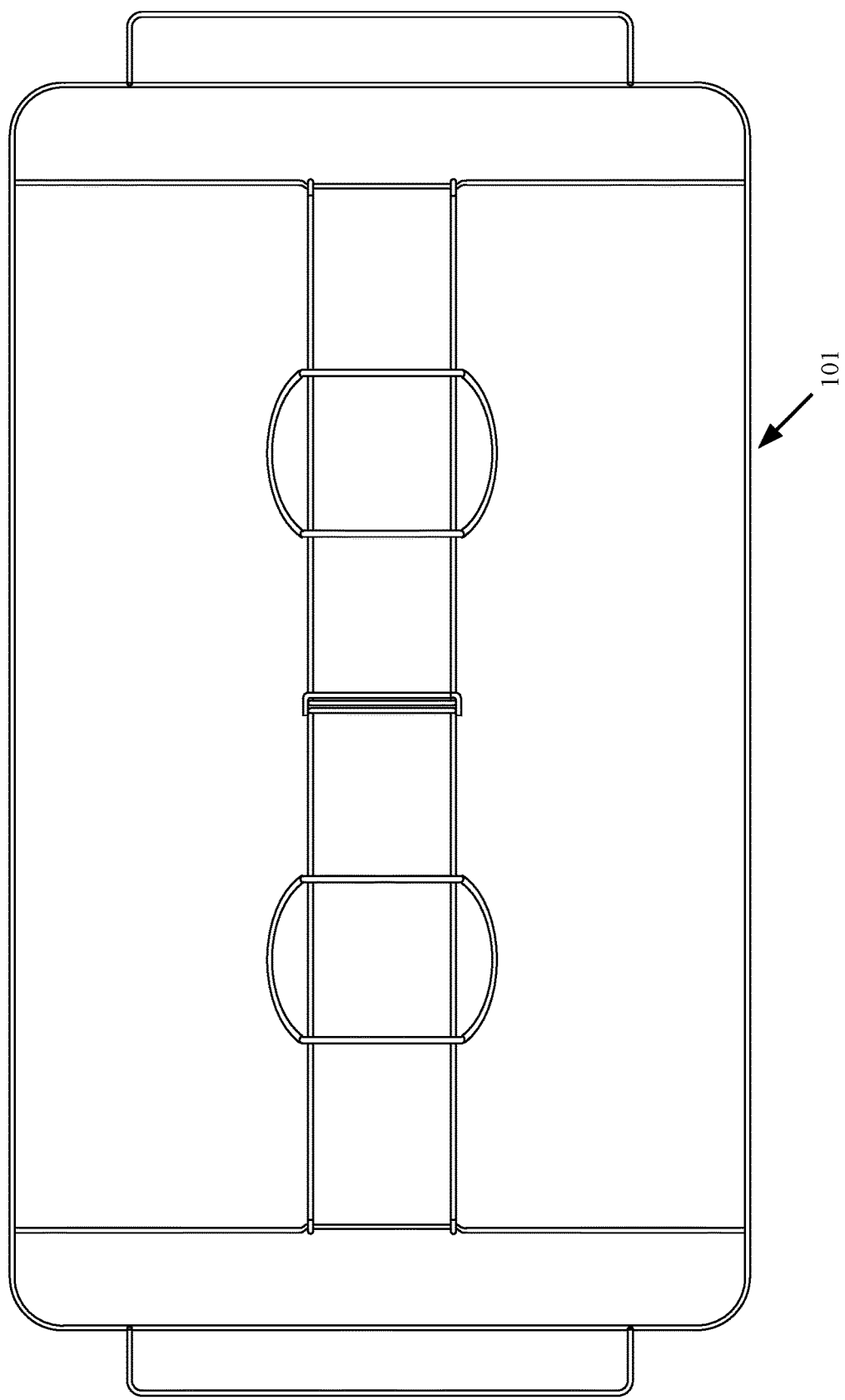
FIG. 3 illustrates a bottom view of a collapsible stand for a chafing dish pan, in accordance with the embodiment of FIG. 1.

In one embodiment, cross-beams 130A and 140A may be configured to be a single wire member that spans the distance. To provide for torsional stability of the support provided to the stand 101, the cross beams 130 and 140 shown in FIG. 2 and 3 may be used, and the wire may be bent into the geometric shape shown therein. The geometric shape used for the first cross beam 130 and the second cross beam 140 may be the same, or they may be slightly different.

In one embodiment, the first and second legs 110/120 may be pivotally coupled to the sides 105C/105D of the rim 105 at a slightly farther distance, respectively, from the sides 105A/105B of the rim, and the legs may also be locked in the extended positon by the cross beams 130 and 140 at an angle that is closer to ninety degrees. This may serve to reduce the length of the cross-beams, and save additional material usage (compare the cross beams 130 and 140 of chafer stand 101 herein, as show. in the collapsed position of FIG. 10, where the beams do not reach the rim sides 105A/105B, with the chafer stand of U.S. Patent Application Pub. No. 2005/0167381, as particularly seen in FIG. 3B of that publication, in which the cross beams extend well beyond the corresponding sides of the rim).

The collapsible stand 101 may also have a wire member 150 shaped and bent to support a fuel canister holder, which wire may be secured to the first cross bar 130. The collapsible stand 101 may also have another wire member 160 shaped and bent to support another fuel canister holder, which wire may be secured to the second cross bar 140.

The collapsible stand 101 may also have a wire member 191 shaped and bent to serve as a first handle, which wire may be secured to one end of the rim 105. The collapsible stand 101 may also have a wire member 192 shaped and bent to serve as a second handle, which wire may be secured to the opposite end of the rim 105.

The material savings alone, apart from the other improvements, may be seen in a weight comparison of the chafer stand 101 disclosed herein, and the "chafing dish rack 10" taught in 2005/0167381, as follows:

| CHAFER STAND TYPE | WEIGHT |
|---|---|
| chafer stand 101 | 23.8 ounces |
| chafing dish rack 10 (2005/0167381) | 17.9 ounces |

Figure 12:
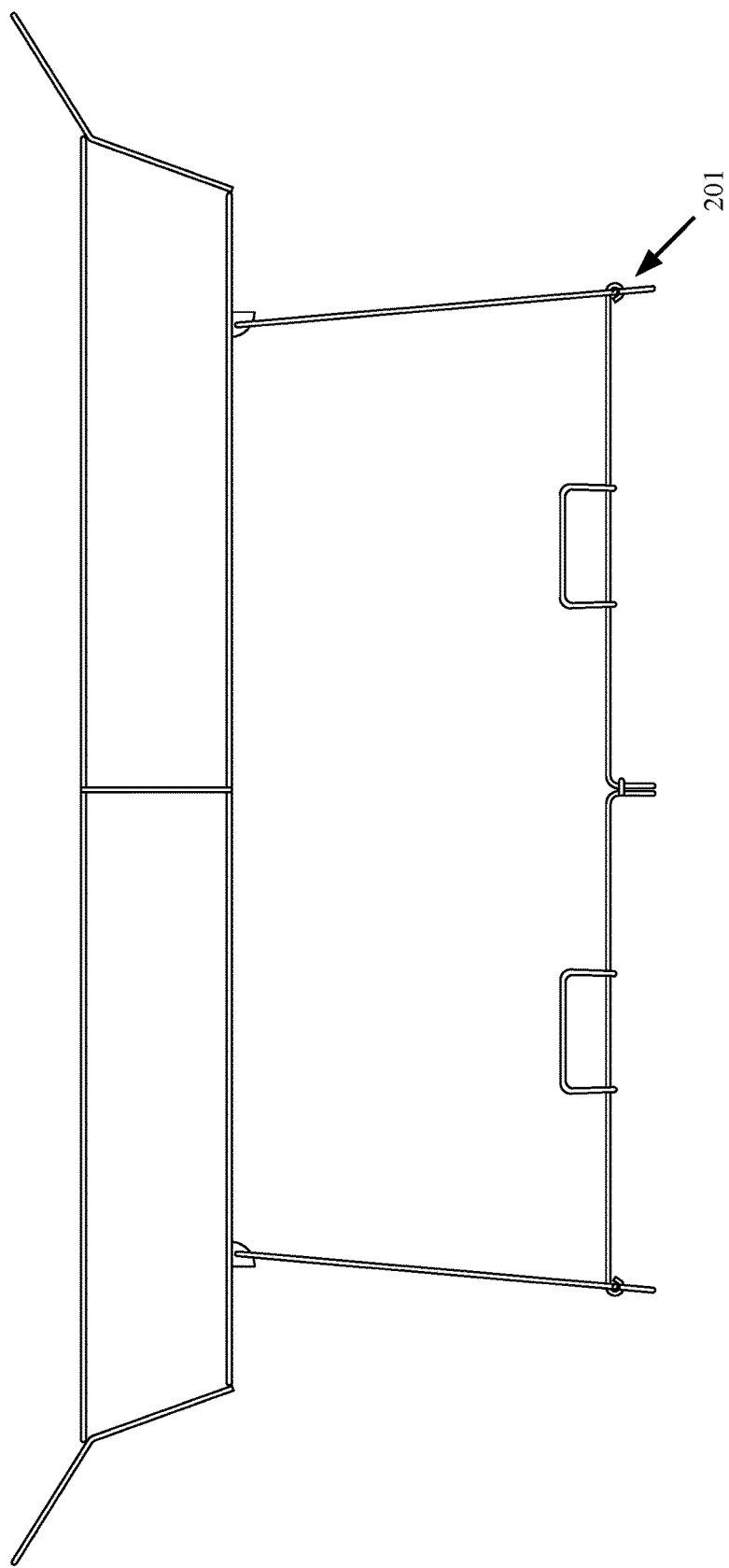
FIG. 12 illustrates a side view of a collapsible stand for a chafing dish pan, in accordance with another embodiment of the present invention.

Another collapsible stand embodiment 201 is shown in FIG. 12, which includes a secondary rim that may provide additional structural rigidity, and which may be coupled to the first rim using an extension of the handles, and additional connector members.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A collapsible stand, for use in supporting at least one chafing dish pan, said collapsible stand comprising:

a rim configured to circumscribe an open area sized and shaped to receive a portion of the chafing dish pan therethrough, and to support at least a portion of the chafing dish pan;

a first leg having a first end and a second end, said first leg formed into a first geometric shape configured for said first end to be in proximity to a first portion of a first side of said rim, and for said second end to be in proximity to a second portion of said rim at a second side thereof;

a second leg having a first end and a second end, said second leg formed into a second geometric shape configured for said first end of said second leg to be in proximity to a third portion of said rim being on said first side of said rim, and for said second end of said second leg to be in proximity to a fourth portion of said rim, being on said second side of said rim;

a hinge for each of said first and second ends of said first leg and for each of said first and second ends of said second leg, each said hinge configured to pivotally couple said respective end to said rim, for each said leg to pivot between a collapsed position and a support position;

wherein said hinge for each of said ends of said first and second legs comprises:

a plate comprising a hole, said plate fixedly secured to said rim with said hole positioned at a location for said pivotal coupling;

a portion of said leg proximate to said end being formed into a 90 degree bend, with said bent portion proximate to said end being received through said hole in said plate; and with said end of said bent portion being formed into a head to trap said plate between said bend and said head;

a first cross bar pivotally coupled to said first leg;

a second cross bar pivotally coupled to said second leg;

a hook, said hook having a first portion secured to said first cross bar, and a second portion configured to releasably couple to said second cross bar, when said first and second legs are in said support position.

2. The collapsible stand according to claim 1, wherein said first leg is formed of a first wire member bent into said first geometric shape, said second leg is formed of a second wire member bent into said second geometric shape, said first cross bar is formed of a third wire member bent into a third geometric shape, and said second cross bar is formed of a fourth wire member bent into a fourth geometric shape;

wherein said pivotal coupling of said first cross bar to said first leg comprises an end of said third wire member bent about a portion of said first wire member;

wherein said pivotal coupling of said second cross bar to said second leg comprises an end of said fourth wire member bent about a portion of said second wire member; and wherein each said hinge, each of said bends, and each of said geometric shapes are configured to minimize material usage to form said collapsible stand.

3. The collapsible stand according to claim 2 wherein each of said third and fourth wire members being bent for said pivotal coupling comprises being bent into a substantially part-torus shape.

4. The collapsible stand according to claim 3 wherein said location of said plate hole for said pivotal coupling with respect to said rim, and an angle of each said leg with respect to said rim, when in said support position, is configured for each of the following:
 for said first and second cross-bars to comprise a length that does not extend beyond said rim, when in said collapsed position; and
 for a lower-most portion of each of said legs to not project beyond said rim, when in said support position.

5. The collapsible stand according to claim 4 wherein each of said first cross bar and said second cross bar are configured to extend directly towards each other from said respective pivotal coupling to said first leg and said second leg.

6. The collapsible stand according to claim 3 further comprising:
 a fifth wire member shaped and bent to support a fuel canister holder, said shaped and bent fifth wire secured to said first cross bar; and
 a sixth wire shaped and bent to support another fuel canister holder, said shaped and bent sixth wire secured to said second cross bar.

7. The collapsible stand according to claim 6 further comprising:
 a seventh wire member shaped and bent to form a first handle member, said first handle member secured to a fifth portion of said rim; and
 an eighth wire member shaped and bent to form a second handle member, said second handle member secured to a sixth portion of said rim.

8. A chaffer stand comprising:
 a rim configured to receive and support a pan;
 a first leg having a first end and a second end, said first leg formed into a first geometric shape;
 a second leg having a first end and a second end, said second leg formed into a second geometric shape;
 means for pivotally coupling each of said first and second ends of said first leg and each of said first and second ends of said second leg to said rim, permitting each of said first leg and second leg to pivot between a collapsed position and a support position; a first cross bar pivotally coupled to said first leg; a second cross bar pivotally coupled to said second leg;
 a hook, said hook having a first portion secured to said first cross bar, and a second portion configured to releasably couple to said second cross bar, when said first and second legs are in said support position;
 wherein said first leg is formed of a first wire member bent into said first geometric-shape, said second leg is formed of a second wire member bent into said second geometric shape, said first cross bar is formed of a third wire member bent into a third geometric shape, and said second cross bar is formed of a fourth wire member bent into a fourth geometric shape;
 wherein said pivotal coupling of said first cross bar to said first leg comprises an end of said third wire member bent about a portion of said first wire member;
 wherein said pivotal, coupling of said second cross bar to said second leg comprises an end of said fourth wire member bent about a portion of said second wire member;
 wherein each said means for pivotally coupling, each of said bends, and each of said geometric shapes are configured to minimize material usage to form said collapsible stand;
 wherein said means for pivotally coupling is positioned, to provide a pivotal, location with respect to said rim, and an angle of each said leg with respect to said rim in said support position, far each of the following:
  for said first and second cross-bars to comprise a length that does not extend beyond said rim, when in said collapsed position; and
  for a lower-most portion of each of said legs to not project beyond said rim, when in said support position.

9. The stand according to claim 6 wherein each of said third and fourth wire members being bent for said pivotal coupling comprises being bent into a substantially part-torus shape.

10. A collapsible stand, for use in supporting at least one chafing dish pan, said collapsible stand comprising:
 a rim configured to circumscribe an open area sized and shaped to receive a portion of the chafing dish pan therethrough, and to support at least a portion of the chafing dish pan;
 a first leg having a first end and a second end, said first leg formed into a first geometric shape configured for said first end to be in proximity to a first portion of a first side of said rim, and for said second end to be in proximity to a second portion of said rim at a second side thereof;
 a second leg having a first end and a second end, said second leg formed into a second geometric shape configured for said first end of said second leg to be in proximity to as third portion of said rim being on said first side of said rim, and for said second end of said second leg to be in proximity to a fourth portion of said rim, being on said second side of said rim;
 a hinge for each of said first and second ends of said first leg and for each of said first and second ends of said second leg, each said hinge configured to pivotally couple said respective end to said rim, for each said leg to pivot between a collapsed position and a support position;
 wherein said hinge for each of said ends of said first and second legs comprises:
  a plate comprising a hole, said plate fixedly secured to said rim with said hole positioned at a location for said pivotal coupling;
  a portion of said leg proximate to said end being formed into a 90 degree bend, with said bent portion proximate to said end being received through said hole in said plate; and with said end of said bent portion being formed into a head to nest said plate between said bend and said head:
 a first cross bar pivotally coupled to said first leg;
 a second cross bar pivotally coupled to said second leg;

a hook, said hook having a first portion fixedly secured to said first cross bar, and a second portion configured to releasably couple to said second cross bar, when said first and second legs are in said support position;

wherein said first leg is formed of a first wire member bent into said first geometric shape;

wherein said second leg is formed of a second wire member bent into said second geometric shape;

wherein said first cross bar is formed of a third wire member bent into a third geometric shape;

wherein said second cross bar is formed of a fourth wire member bent into a fourth geometric shape;

wherein each of said first cross bar and said second cross bar are configured to extend directly towards each other from said respective pivotal coupling to said first leg and said second leg;

wherein said pivotal coupling of said first cross bar to said first leg comprises an end of said third wire member bent about a portion of said first wire member into a substantially part-torus shape;

wherein said pivotal coupling of said second cross bar to said second leg comprises an end of said fourth wire member bent about a portion of said second wire member into a substantially part-torus shape;

wherein each said hinge, each of said bends, and each of said geometric shapes are configured to minimize material usage to form said collapsible stand; and wherein said location of said plate hole for said pivotal coupling with respect to said rim, and an angle of each said leg with respect to said rim, when in said support position, is configured for each of the following:

for said first and second cross-bars to comprise a length that does not extend beyond said rim, when in said collapsed position; and for a lower-most portion of each of said legs to not project beyond said rim, when in said support position.

* * * * *